United States Patent
Inagawa et al.

(10) Patent No.: US 8,022,562 B2
(45) Date of Patent: Sep. 20, 2011

(54) CYCLOCONVERTER GENERATOR

(75) Inventors: Toshinori Inagawa, Wako (JP);
Shinsaku Nakayama, Wako (JP);
Yoshinori Masubuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/436,971

(22) Filed: May 7, 2009

(65) Prior Publication Data

US 2009/0278362 A1 Nov. 12, 2009

(30) Foreign Application Priority Data

May 9, 2008 (JP) .................. 2008-123323

(51) Int. Cl.
*H02P 0/04* (2006.01)
(52) U.S. Cl. .................. 290/40 A; 290/40 B; 290/40 C
(58) Field of Classification Search ............. 290/40 A, 290/1 R, 1 A, 40 R, 51, 40 B, 40 C; 363/160, 363/161
See application file for complete search history.

(56) References Cited

U.S. PATENT DOCUMENTS

| | | | |
|---|---|---|---|
| 5,788,004 A | | 8/1998 | Friedmann et al. |
| 6,005,297 A | * | 12/1999 | Sasaki et al. ............ 290/4 C |
| 6,037,672 A | * | 3/2000 | Grewe ............... 290/40 A |
| 6,118,186 A | * | 9/2000 | Scott et al. ............ 290/40 B |
| 7,355,294 B2 | * | 4/2008 | Teichmann ............. 290/44 |
| 7,541,687 B2 | * | 6/2009 | Stahlhut et al. ............ 290/52 |

FOREIGN PATENT DOCUMENTS

| | | |
|---|---|---|
| DE | 102005042817 B3 | 12/2006 |
| EP | 0493848 A2 | 7/1992 |
| EP | 0936101 A2 | 8/1999 |
| JP | 61-170300 A | 7/1986 |
| JP | 11-136998 A | 5/1999 |
| JP | 3447934 | 5/1999 |

* cited by examiner

*Primary Examiner* — Michael C Zarroli
(74) *Attorney, Agent, or Firm* — Arent Fox LLP

(57) ABSTRACT

In a cycloconverter generator, AC power required by the load is detected and a desired speed of the engine is determined based on the required AC power, operation of an actuator is controlled such that the engine speed becomes equal to the desired engine speed, and the required AC power is generated by turning on switching elements (thyristors) such that a number of the phase signal within one period of frequency of the AC power, becomes equal to a number determined by the desired engine speed, thereby preventing undesirable increase in fuel consumption and noise by operating the engine at a speed corresponding to required AC power and enabling to generate stable AC power even when the engine speed changes abruptly.

6 Claims, 9 Drawing Sheets

FIG. 15
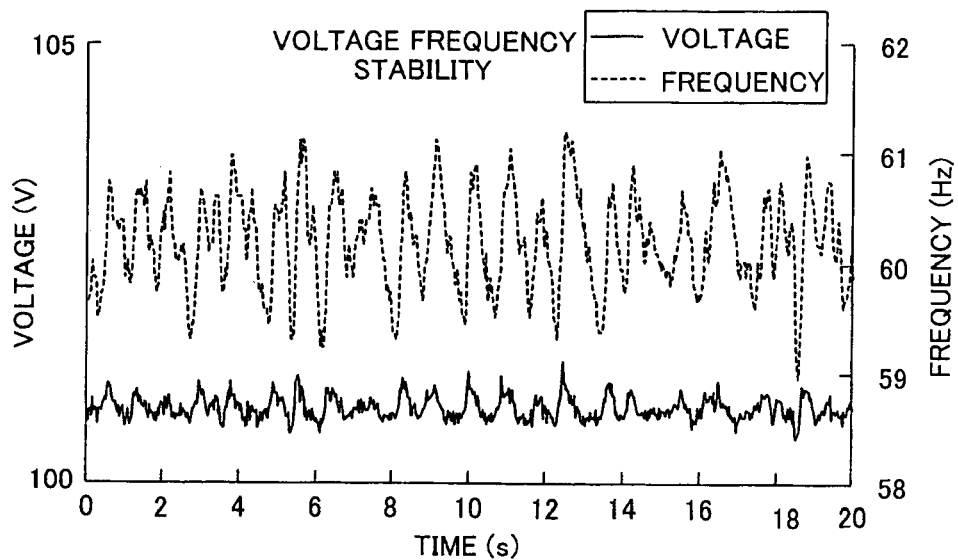
FIG. 16
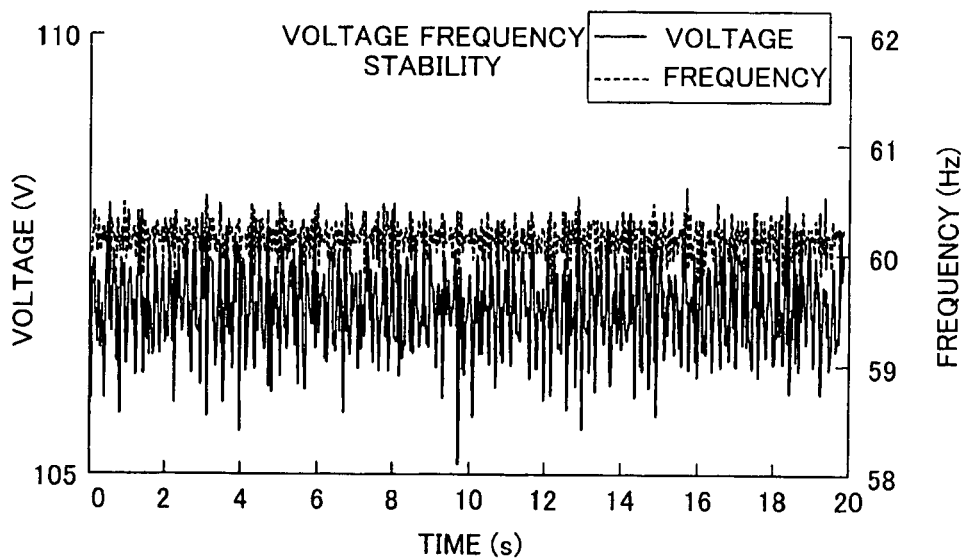
FIG. 17
VOLTAGE STABILITY DATA BETWEEN TYPES
(EFFECTIVE VALUE DURING 20s) (3600rpm)
| TYPES | AVERAGE | MAXIMUM | MINIMUM | STABILITY MAXIMUM | STABILITY MINIMUM |
|---|---|---|---|---|---|
| SYNCHRONIZED | 100.86V | 101.38V | 100.51V | 0.52% | 0.35% |
| NON-SYNCHRONIZED | 106.91V | 108.17V | 105.12V | 1.18% | 1.68% |

US 8,022,562 B2

CYCLOCONVERTER GENERATOR

BACKGROUND OF THE INVENTION

1. Field of the Invention

This invention relates to a cycloconverter generator, namely a generator that converts AC power of a given frequency to another frequency for output.

2. Description of the Related Art

The cycloconverter generator that is driven by an internal combustion engine to produce an output by converting AC power of a given frequency to another frequency is well known. A description of the cycloconverter generator technology can be found, for example, in Japanese Patent No. 3,447,934. The cycloconverter generator described in this reference is equipped with thyristors bridge-connected in antiparallel connection to three-phase output windings in the positive and negative directions and generates single-phase alternating current of a desired frequency by turning on the thyristors at variable timing (width or angle) every half-period of the desired alternating current frequency.

SUMMARY OF THE INVENTION

In this type of cycloconverter generator, when it is intended to keep a desired frequency of AC power to be generated constant, the connected internal combustion engine has to be operated at constant engine speed regardless of magnitude of power required by the load. Hence, when the power required by the load is small, fuel consumption and noise are disadvantageously increased.

An object of this invention is therefore to overcome these drawbacks by providing a cycloconverter generator that can prevent undesirable increase in fuel consumption and noise by operating an internal combustion engine at a speed corresponding to power required by the load, and can generate stable AC power even when the engine speed changes abruptly.

In order to achieve the objects, this invention provides, in a first aspect, a cycloconverter generator equipped with a magneto having an internal combustion engine and three-phase output windings facing a pair of permanent magnets to produce three-phase output when one of the windings and permanent magnets is rotated by the engine, single-phase output windings facing the permanent magnets to produce phase signals each indicative of a phase of the three-phase output per one rotation; a bridge circuit comprising positive and negative switching elements bridge-connected in antiparallel connection to the three-phase output windings to constitute a cycloconverter, and an AC power generator that generates single-phase AC power to be supplied to a load by turning on the switching elements in accordance with a desired frequency, comprising: an actuator adapted to change a speed of the engine; a required power detector that detects AC power required by the load; a desired engine speed determiner that determines a desired speed of the engine based on the required AC power; and an actuator controller that controls operation of the actuator such that the engine speed becomes equal to the desired engine speed; wherein the AC power generator generates the required AC power by turning on the switching elements such that a number of the phase signal to be produced within one period of frequency of the AC power to be generated, becomes equal to a number determined by the desired engine speed.

In order to achieve the objects, this invention provides, in a second aspect, a method of controlling a cycloconverter generator equipped with a magneto having an internal combustion engine and three-phase output windings facing a pair of permanent magnets to produce three-phase output when one of the windings and permanent magnets is rotated by the engine, single-phase output windings facing the permanent magnets to produce phase signals each indicative of a phase of the three-phase output per one rotation; a bridge circuit comprising positive and negative switching elements bridge-connected in antiparallel connection to the three-phase output windings to constitute a cycloconverter, and an actuator adapted to change a speed of the engine, comprising the steps of: detecting AC power required by the load; determining a desired speed of the engine based on the required AC power; controlling operation of the actuator such that the engine speed becomes equal to the desired engine speed; and generating single-phase AC power to be supplied to a load by turning on the switching elements in accordance with a desired frequency, and the step of AC power generating generating the required AC power by turning on the switching elements such that a number of the phase signal to be produced within one period of frequency of the AC power to be generated, becomes equal to a number determined by the desired engine speed.

BRIEF DESCRIPTION OF THE DRAWINGS

The above and other objects and advantages of the invention will be more apparent from the following description and drawings in which:

FIG. 15 is a data diagram showing a result of simulation for verifying the stability of output voltage and frequency when the engine speed changes abruptly in the control shown in FIG. 13;

FIG. 16 is a data diagram similarly to FIG. 15, but showing a result obtained by the control shown in FIG. 14; and FIG. 17 is a table diagram numerically showing the data of FIGS. 15 and 16.

DETAILED DESCRIPTION OF THE PREFERRED EMBODIMENT

Figure 1:
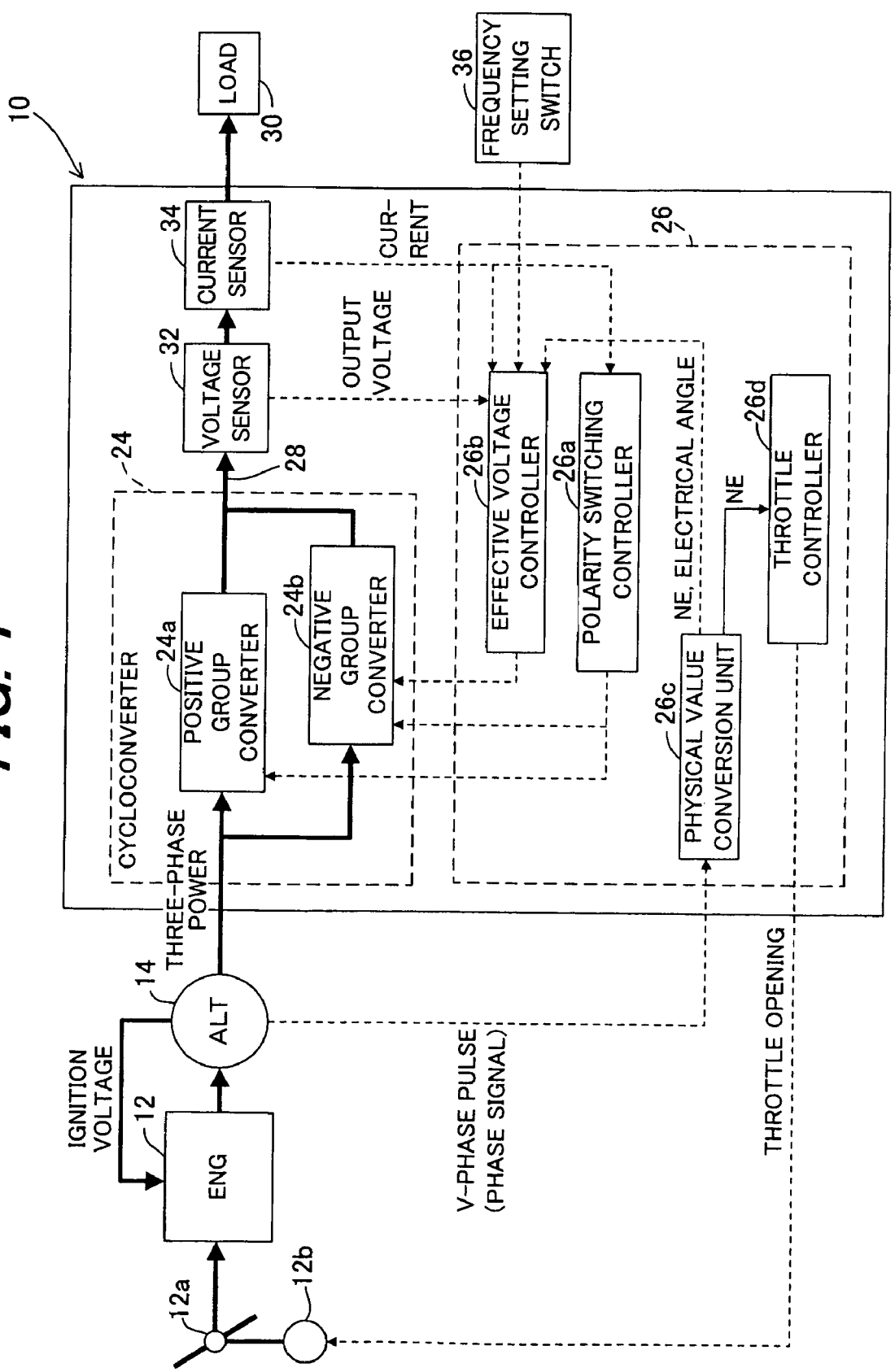
FIG. 1 is a block diagram showing the overall configuration of a cycloconverter generator according to this embodiment of the present invention.

FIG. 1 is a block diagram showing the overall configuration of the cycloconverter generator according to the present invention.

Reference numeral 10 is assigned to the cycloconverter generator in FIG. 1. The generator 10 is equipped with an internal combustion engine 12 (named ENG in the drawing). It has rated outputs of AC 100 V-2.3 kVA and DC 12 V-10 A. The engine 12 is an air-cooled, spark ignition unit whose throttle valve 12a is moved by an actuator 12b comprising a stepper motor or the like. It is started using a recoil starter (not shown).

The generator 10 is equipped with a magneto or alternator 14 (named ALT in FIG. 1) that is driven by the engine 12.

Figure 2:
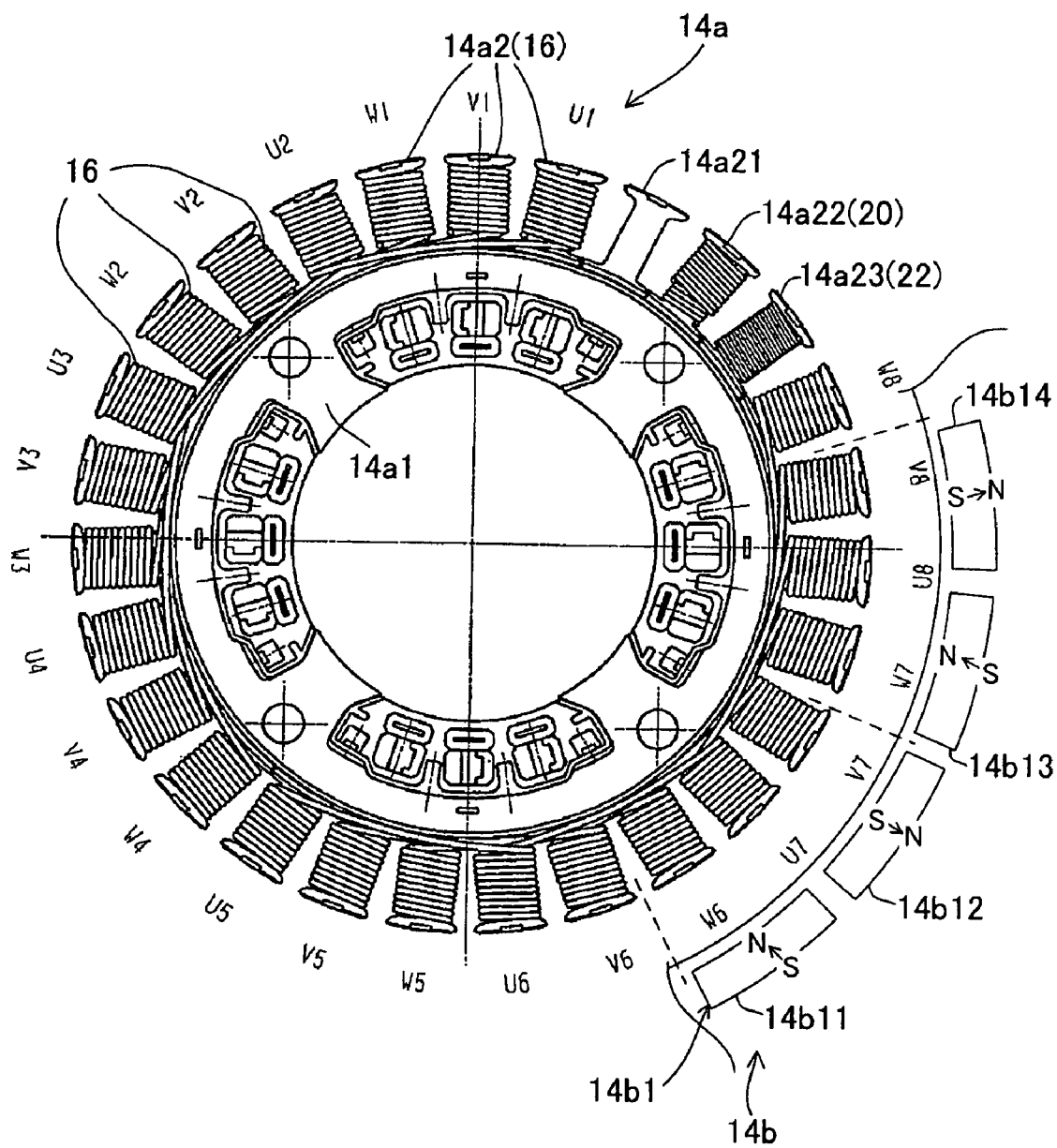
FIG. 2 is a plan view of a stator constituting a magneto shown in FIG. 1.

FIG. 2 is a plan view of a stator 14a of the magneto 14.

The stator 14a is equipped with a stator core 14a1 fastened near the cylinder head of the engine 12. As illustrated, twenty-seven teeth 14a2 are formed to project radially from the stator core 14a1. Twenty-four of the teeth 14a2 are wound with coils Un, Vn and Wn (n: 1 to 8) to form three-phase (U, V and W) output windings (main windings) 16.

Among the three teeth 14a21, 14a22 and 14a23 located between coils U1 and W8, the tooth 14a21 corresponding to W phase is not wound with a coil, while the tooth 14a22 corresponding to V phase and the tooth 14a23 corresponding to U phase are wound with coils to form single-phase output windings 20 and 22.

A rotor 14b is installed around the stator 14a. Nine pairs of permanent magnets 14b1 (18 magnets) are attached inside the rotor 14b at positions opposite the aforesaid coils and with their radially oriented polarities reversed alternately as illustrated. Two permanent magnets 14b1 (e.g., 14b11 and 14b12) form one pair, and one pair of the permanent magnets 14b1 is installed per three teeth 14a2. The rotor 14b also serves as the flywheel of the engine 12.

When the permanent magnets 14b1 of the rotor 14b surrounding the stator 14a rotate, three-phase alternating current is outputted from the three-phase output windings 16 and single-phase alternating current is outputted from the single-phase output winding 20, i.e., V-phase pulses (phase signal) indicating the phase of the output of the magneto 14, more exactly the output of the output windings 16, are outputted from the single-phase output winding 20. Single-phase alternating current is also outputted from the output winding 22.

Returning to the explanation of FIG. 1, the three-phase alternating current generated by the magneto 14 is inputted to a bridge circuit 24 of the cycloconverter.

Figure 3:
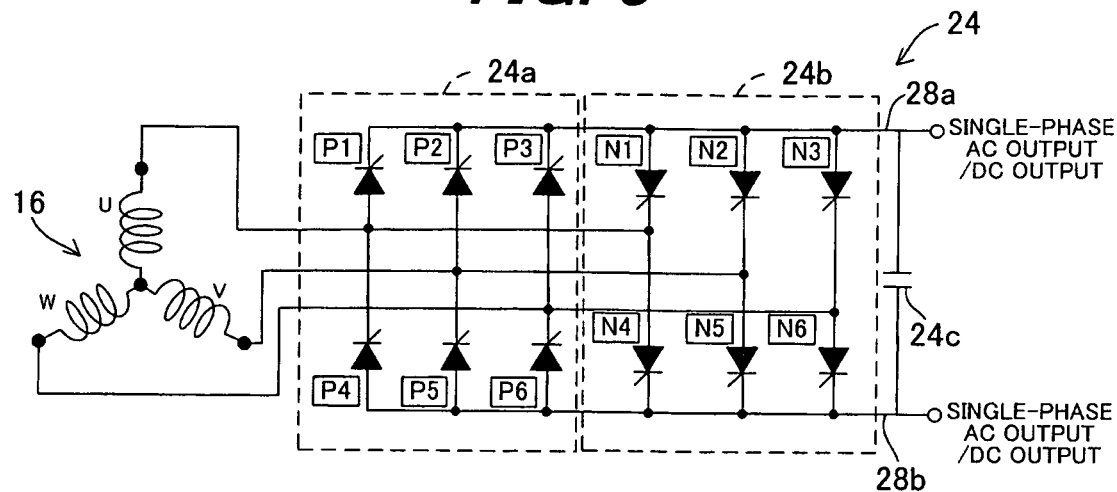
FIG. 3 is a block diagram showing the structure of a bridge circuit of a cycloconverter shown in FIG. 1 in detail.

FIG. 3 is a block diagram showing the structure of the bridge circuit 24 of the cycloconverter in detail. As illustrated, the bridge circuit 24 of the cycloconverter comprises a positive group converter 24a, a negative group converter 24b and a smoothing capacitor 24c.

The positive group converter 24a comprises a total of six thyristors (SCRs; positive switching element group) Pn (n: 1 to 6) arranged in three parallel connected pairs with their cathodes facing the positive side. The negative group converter 24b comprises the same number of thyristors (SCRs; negative switching element group) Nn (n: 1 to 6) arranged in three parallel connected pairs with their cathodes facing the negative side. Thus the bridge circuit 24 of the cycloconverter is structured as a bridge circuit comprising the positive and negative switching element groups bridge-connected in antiparallel connection to the three-phase output windings 16.

The output terminals of the three-phase output windings 16 are connected to midpoints of the paired thyristors Pn, Nn. In other words, the positive group converter 24a and negative group converter 24b are bridge-connected in antiparallel connection to the three-phase output windings 16 to each other.

Returning to the explanation of FIG. 1, the bridge circuit 24 is connected to an Electronic Control Unit (ECU) 26.

The ECU 26 is equipped with a polarity switching controller 26a, an effective voltage controller 26b, a physical value conversion unit 26c, and a throttle controller 26d. The ECU 26 includes a microcomputer equipped with a CPU, ROM, RAM, I/O ports and the like, and the aforesaid polarity switching controller 26a, etc., are operations of the CPU expressed functionally.

As explained further later, the polarity switching controller 26a of the ECU 26 selects (switches to) the one of the positive group converter 24a and negative group converter 24b of the bridge circuit 24 whose thyristors are to be turned on, and the effective voltage controller 26b controls the turning timing (angle or width). The three-phase alternating current inputted in this manner is converted to single-phase alternating current that is supplied to a load 30 through a power feed line 28.

As illustrated, the V-phase pulses (phase signal) outputted from the output winding 20 are sent through the physical value conversion unit 26c of the ECU 26 to the polarity switching controller 26a and effective voltage controller 26b. The physical value conversion unit 26c counts the V-phase pulses to detect the engine speed NE. The output of the output winding 22 is wave-formed and supplied as ignition voltage to an ignition coil, etc., of an ignition system (not shown) of the engine 12.

The engine speed NE detected by the physical value conversion unit 26c is sent to the throttle controller 26d. The throttle controller 26d uses an adaptive controller (self-tuning regulator) to regulate the operation of the actuator 12b so as to control the opening/closing of the throttle valve 12a as required to converge the detected engine speed NE to the desired engine speed NED. The details of this control will not be explained here because they are not directly related to the purport of the invention.

The detected engine speed NE and the phase signal are sent to the effective voltage controller 26b. A voltage sensor 32 and a current sensor 34 are installed in the power feed line 28 and produce outputs or signals proportional to the voltage and current of the power feed line 28. The outputs of the voltage sensor 32 and current sensor 34 are sent to the polarity switching controller 26a and effective voltage controller 26b.

A frequency setting switch (SW) 36 that the operator can use to set or input the desired frequency (60 Hz or 50 Hz according to the commercial power system to be emulated) is provided on the control panel (not shown) of the cycloconverter generator 10 or at some other appropriate location readily accessible to the operator. The switch 36 is thus adapted to allow the operator to set the desired frequency. An output of the switch 36 is also sent to the effective voltage controller 26b.

The operation of the polarity switching controller 26a and effective voltage controller 26b will next be explained regarding the case of converting the three-phase alternating current to single-phase alternating current of the desired frequency of 60 Hz (or 50 Hz) of a commercial power system.

Figure 4:
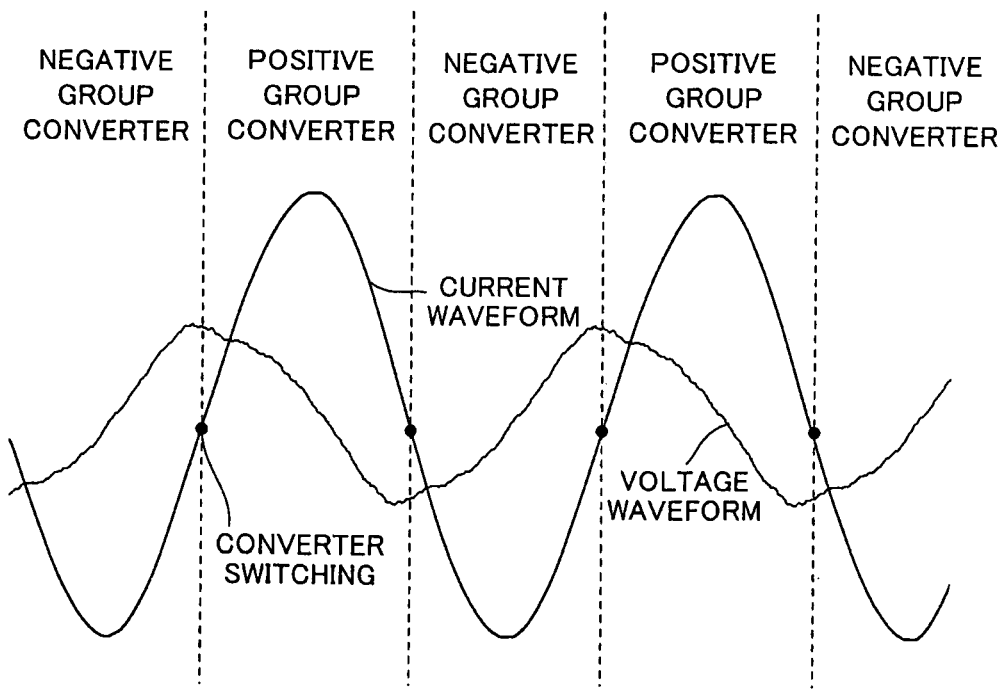
FIG. 4 is a time chart showing the operation of switching (selecting) between a positive group converter and negative group converter by a polarity switching controller of an electronic control unit (ECU) shown in FIG. 1 when converting to alternating current.

In this case, as shown in FIG. 4, the polarity switching controller 26a determines which thyristor between the positive group converter 24a and negative group converter 24b is to be turned on based on the inclination of alternating current detected by the current sensor 34.

Specifically, the polarity switching controller 26a determines that the thyristor of the positive group converter 24a is to be turned on when the detected current exceeds the 0 level on the positive side and that the thyristor of the negative group converter 24b is to be turned on when it exceeds the 0 level on the negative side.

Figure 5:
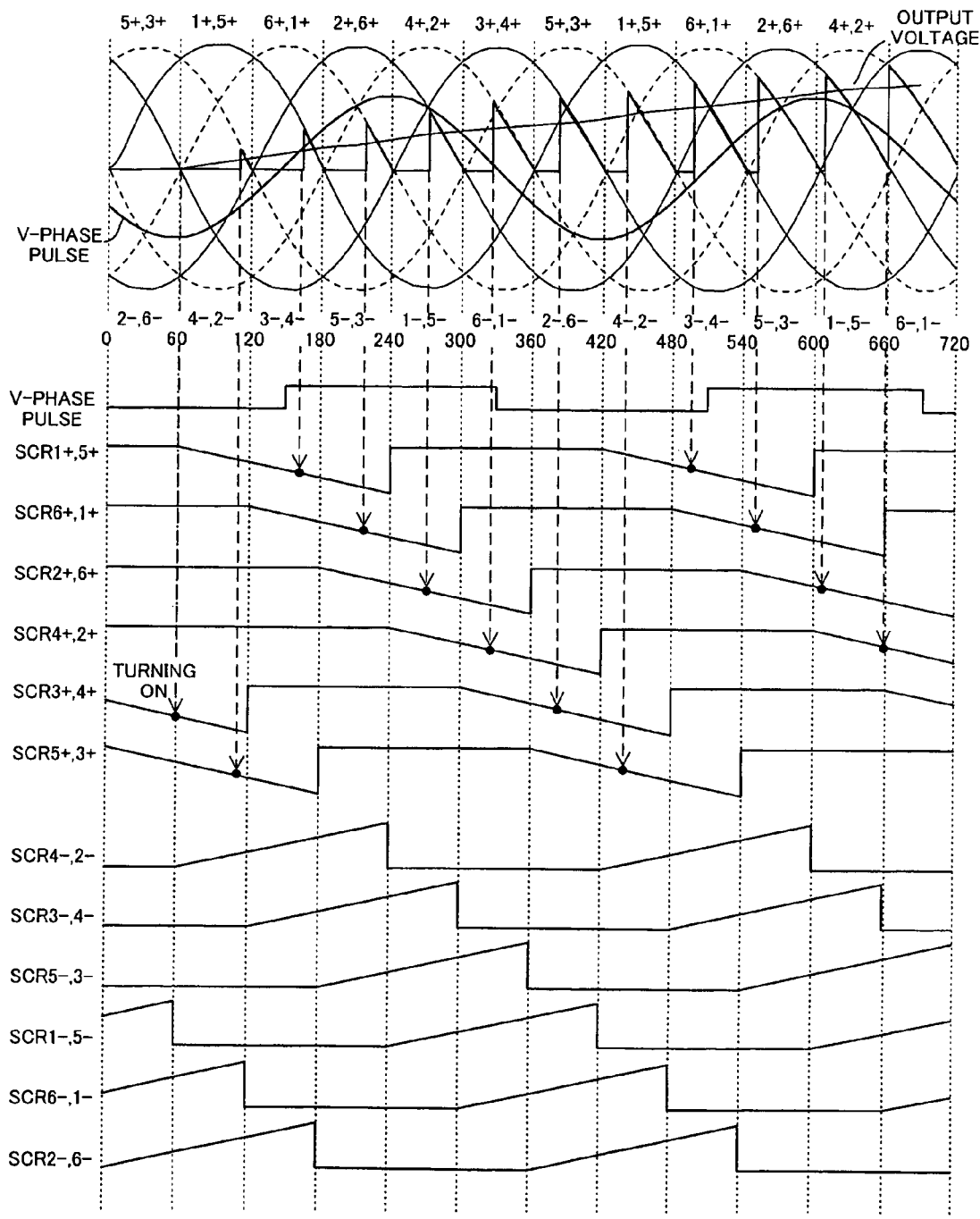
FIG. 5 is a time chart similarly showing thyristor turning-on operation of the positive group converter and negative group converter by an effective voltage controller of the ECU shown in FIG. 1 when converting to alternating current.
Figure 6:
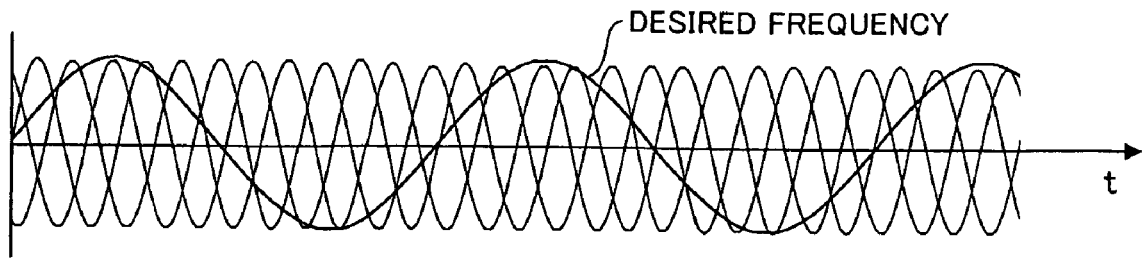
FIG. 6 is a time chart of a desired frequency waveform used in the thyristor turning-on operation of the positive group converter and negative group converter shown in FIG. 5.

Based on the aforesaid phase signal and reference sawtooth waves, like those shown in FIG. 5, generated for respective ones of the 12 thyristors Pn, Nn, (designated SCRn+, n− in the drawing) of the positive group converter 24a and negative group converter 24b, and based on the desired frequency waveform, like that shown in FIG. 6, set by the operator using the frequency setting switch SW36 and the results of comparisons performed by comparators (not shown) installed in association with respective ones of the twelve thyristors Pn, Nn, the effective voltage controller 26b turns on the thyristors at the timings indicated by arrows in the drawing, thereby controlling the effective output voltage to the desired voltage. In FIG. 5, the voltages applied between UV, VW and WU are represented by solid curves and the voltages reversely applied between VU, WV, UW are represented by broken curves.

As shown in FIG. 3, the generated single-phase alternating current controlled to the desired effective voltage by the effective voltage controller 26b is smoothed by the smoothing capacitor 24c and supplied to the load 30 through the power feed line 28, more exactly power feed lines 28a and 28b. Thus, the cycloconverter is composed of the bridge circuit 24 and ECU 26.

Here, explaining an object of this invention again, in a conventional cycloconverter generator, when it is intended to keep a desired frequency of AC power to be generated constant, the connected internal combustion engine has to be operated at constant speed regardless of the magnitude of power required by the load. Since, in the case where the power required by the load is small, fuel consumption and noise are disadvantageously increased, the object of this invention is to overcome these drawbacks.

Figure 7:
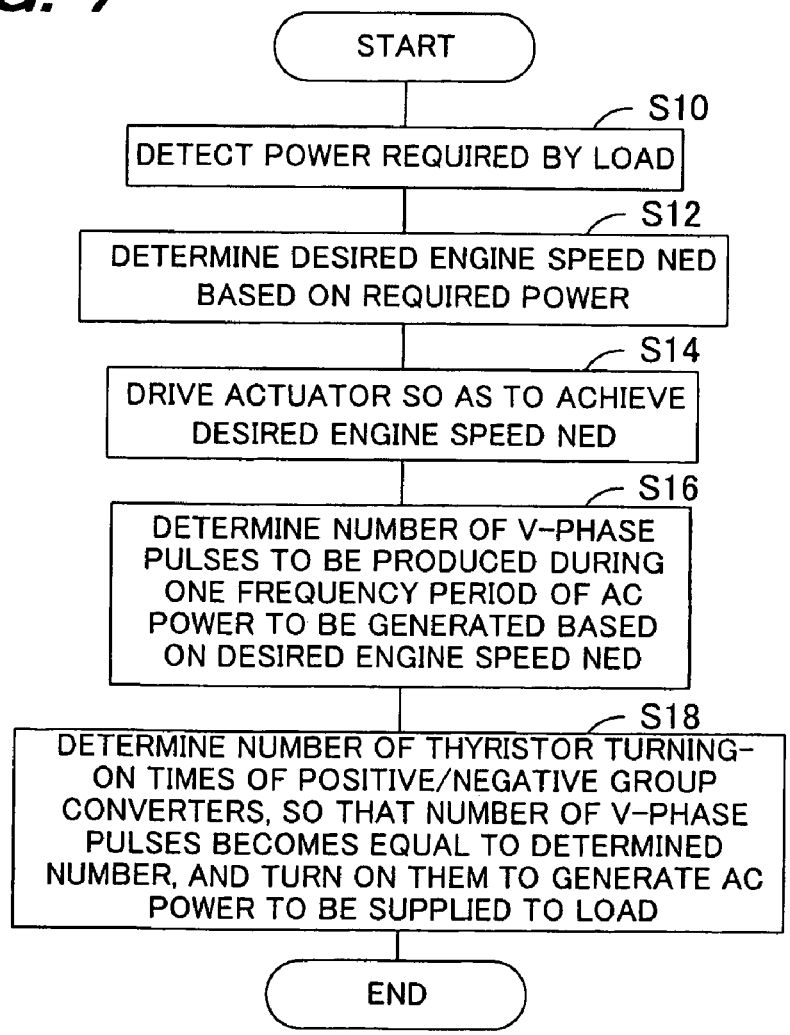
FIG. 7 is a flowchart showing the operation by the effective voltage controller of the ECU shown in FIG. 1.

The explanation will be made on this point. FIG. 7 is a flowchart showing the operation of the generator 10, i.e., the operation of the ECU 26, more precisely of the effective voltage controller 26b.

In S10, power required by the load 30 is detected. This processing is made by calculating effective power [VA] of the load 30 by multiplying the detected value of the voltage sensor 32 by that of the current sensor 34.

In S12, the desired engine speed NED is determined based on the calculated required power (effective power) of the load 30. Specifically, this is done by retrieving the characteristics shown in FIG. 8 using the calculated required power.

Figure 8:
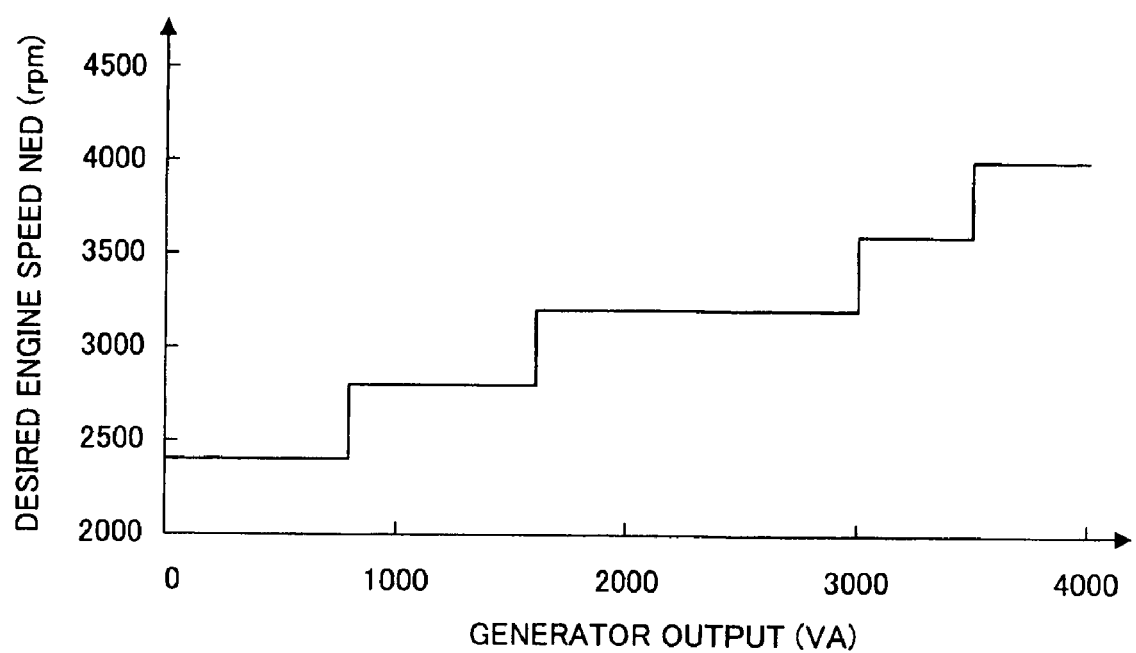
FIG. 8 is a graph showing the characteristics of desired engine speed set in response to power required by a load, which is used in the processing of FIG. 7.

The desired engine speed NED is the minimum engine speed that satisfies the required power of the load 30, specifically, the engine speed (present engine speed) NE detected when the engine 12 has been started by the recoil starter. As illustrated, the desired engine speed NED is set to change in stages, i.e., at every 400 rpm. The characteristics shown in FIG. 8 is experimentally obtained and stored as table values in the memory of the ECU 26 beforehand.

In S14, the actuator 12b is driven through the throttle controller 26d so as to achieve the determined desired engine speed NED.

In S16, based on the determined desired engine speed NED, a number of the V-phase pulses (V-phase pulse waveform; phase signal) to be produced within one period of the set frequency of AC power to be generated, i.e., during one period of output voltage waveform, is determined.

In S18, a number of thyristor turning-on times of the positive and negative group converters 24a, 24b is determined so that the number of the V-phase pulses actually produced within one period of the AC power frequency (i.e., during one period of output frequency) becomes equal to the determined number, and the thyristors of the converters 24a, 24b are turned on to generate the AC power to be supplied to the load 30.

Figure 9:
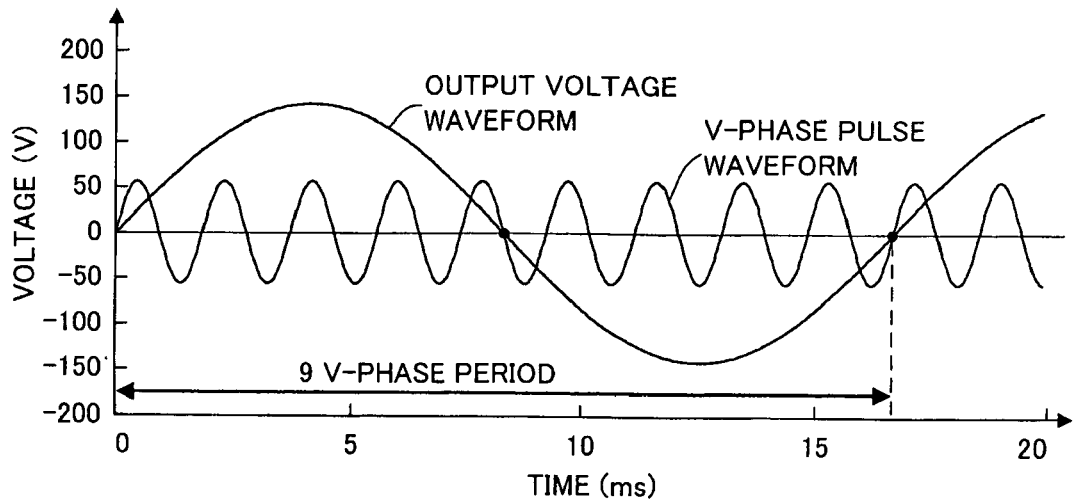
FIG. 9 is a time chart showing a number of phase signals (V-phase pulses) produced within one period in a desired frequency calculated in the processing of FIG. 7.

Explaining this processing further, since the magneto 14 includes the nine pairs of permanent magnets 14b1, nine V-phase pulses are produced per one rotation of the rotor 14b. Therefore, when the set desired frequency is 60 Hz and the desired engine speed NED is 3600 rpm, nine V-phase pulses fall within one period of the desired frequency, in other words, the V-phase pulse waveform of nine periods is produced within one period of the frequency as shown in FIG. 9.

Specifically, a number of thyristor turning-on times of the positive and negative group converters 24a, 24b within one period must be solely determined based on a number of the permanent magnets and engine speed NE, as in the following:

A number of thyristor turning-on times=(engine speed frequency/desired frequency)×a number of magnets×a number of output windings When, for instance, the engine speed NE is 3600 rpm and the desired frequency is 60 Hz, a number of tyristor turning-on times is determined as follows:

A number of thyristor turning-on times={(3600/60)/60}×18×3=54

In this case, if the power required by the load 30 is small, the desired engine speed NED should preferably decreased from 3600 rpm. However, if the engine 12 is kept controlled to produce nine V-phase pulses (nine periods) within one period of the desired frequency, the frequency (output frequency) of the generated AC power will decrease with decreasing engine speed NED.

Figure 10:
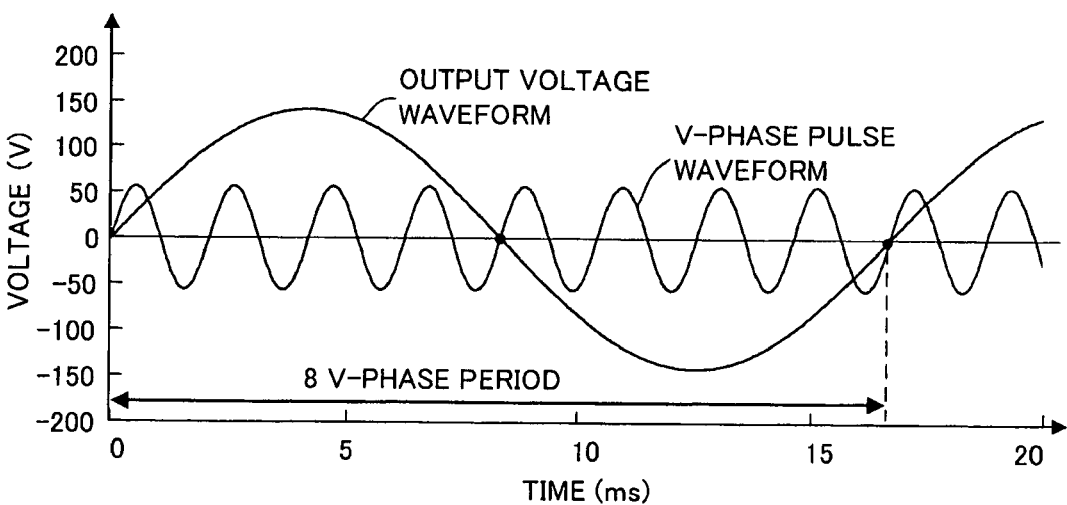
FIG. 10 is a time chart similarly showing a number of the phase signals (V-phase pulses) produced within one period in the desired frequency calculated in the processing of FIG. 7.
Figure 11:
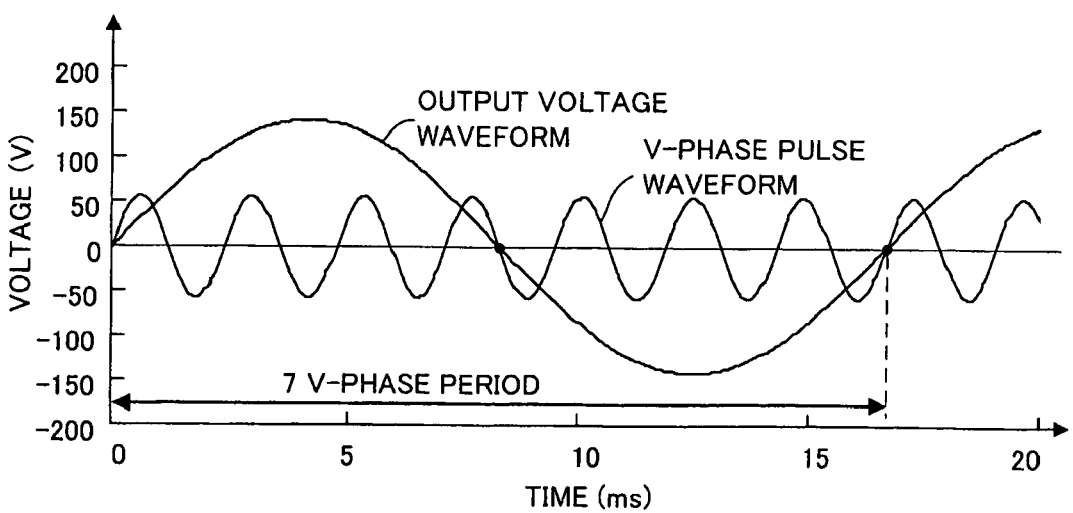
FIG. 11 is a time chart similarly showing a number of the phase signals (V-phase pulses) produced within one period in the desired frequency calculated in the processing of FIG. 7.

Therefore, in this embodiment, a number of the V-phase pulses falling within one period is determined to increase/decrease in response to increase/decrease in the desired engine speed NED. For example, when the desired engine speed NED drops to 3200 rpm, a number of the V-phase pulses is decreased to eight (eight periods) as shown in FIG. 10, and when it further drops to 2800 rpm, the number is decreased to seven (seven periods) as shown in FIG. 11. Thus, a number of the V-phase pulses (phase signal) to be produced within one period is determined or corrected in response to the determined desired engine speed NED.

Figure 12:
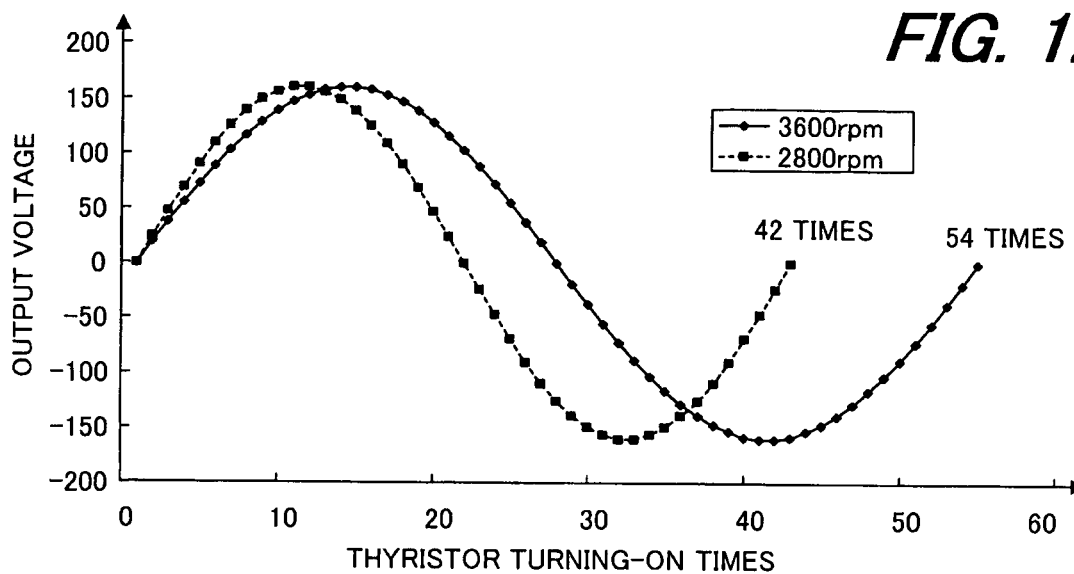
FIG. 12 is a graph showing the characteristics of a number of thyristor turning-on times of the positive group converter and negative group converter, which is used in the processing of FIG. 7.

In other words, a number of thyristor turning-on times of the positive and negative group converters 24a, 24b is determined based on the characteristics shown in FIG. 12, such that a number of the V-phase pulses produced within one period of the AC power frequency becomes equal to the corrected (increased/decreased) number, and the thyristors of the converters 24a, 24b are turned on in accordance with the determined turning-on times.

Specifically, according to the characteristics shown in FIG. 12, when the desired engine speed NED is 3600 rpm, the number of thyristor turning-on times is 54 and when it is 2800 rpm, the number is 42. With this arrangement, it becomes possible to generate AC power of the same frequency as the desired frequency 60 Hz if the engine speed changes. The characteristics shown in FIG. 12 should be experimentally obtained and stored as table values in the memory of the ECU 26 beforehand.

As shown in FIGS. 9 to 11, the thyristor turning-on operation is conducted in such a manner that the AC power frequency (output voltage waveform) and the zero cross-point of the V-phase pulses (V-phase pulse waveform) are made identical to each other, specifically in such a manner that the zero cross-point of the AC power frequency and that of the V-phase pulses are made identical to each other, more specifically in such a manner that the output frequency and engine speed NE are surely synchronized.

Figure 13:
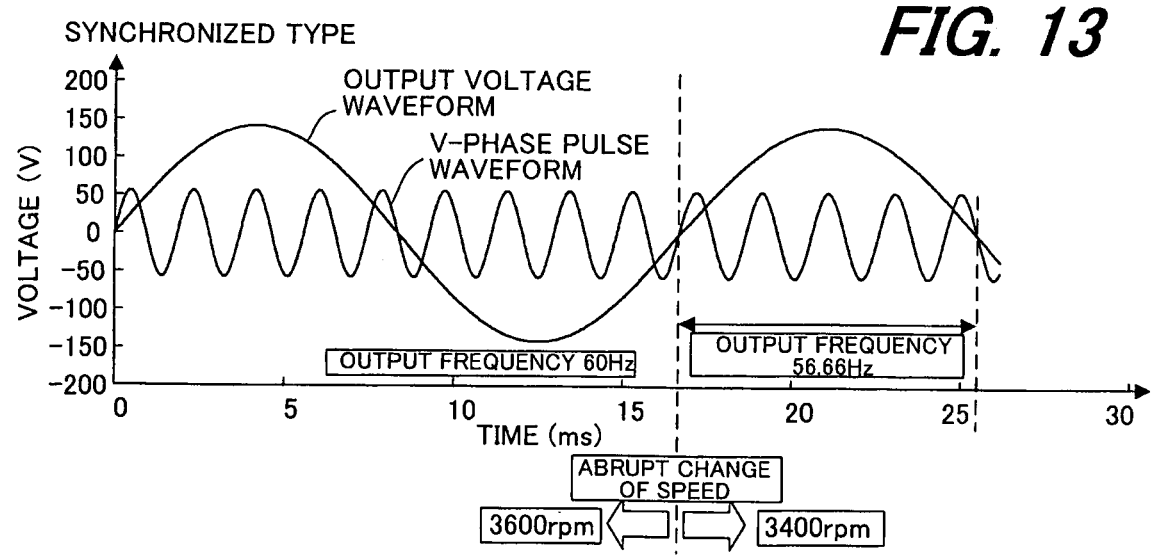
FIG. 13 is a time chart showing the control to synchronize the frequency of an output of the generator with the engine speed according to the embodiment.
Figure 14:
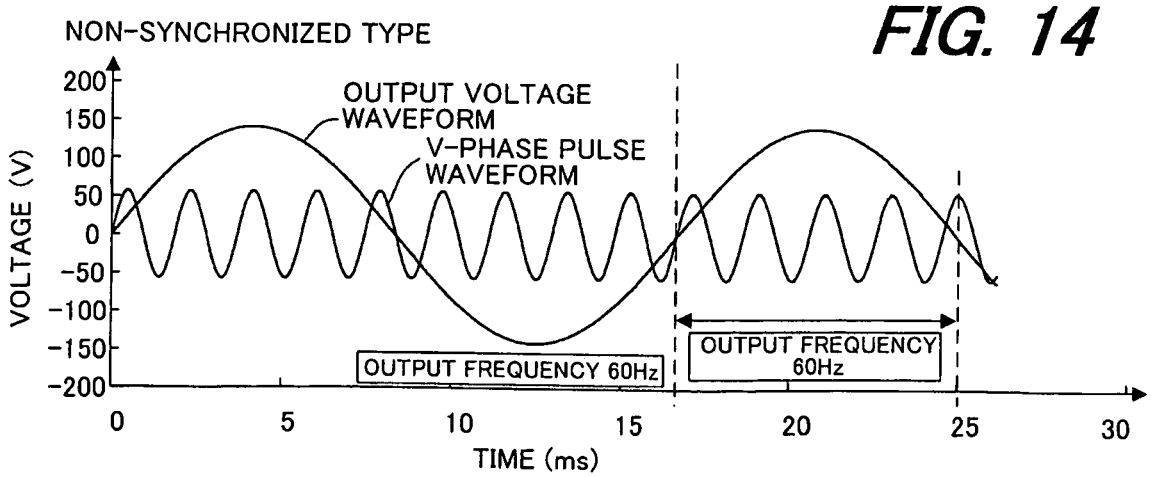
FIG. 14 is a time chart showing the control to produce output at constant frequency according to a prior art.

FIG. 13 is a time chart showing the control to synchronize the output frequency with the engine speed NE according to the embodiment, FIG. 14 is a time chart showing the control to output a constant frequency according to a prior art, FIG. 15 is a data diagram showing a result of simulation for verifying the stability of output voltage and frequency when the engine speed NE changes abruptly in the control shown in FIG. 13, FIG. 16 is a data diagram similarly showing a simulation result of the control shown in FIG. 14, and FIG. 17 is a table diagram numerically showing the data of FIGS. 15 and 16.

As shown in FIGS. 13 and 15, in this embodiment the engine operation is controlled to synchronize the output frequency with the engine speed NE, i.e., is controlled so that a number of the V-phase pulses produced within one period of the output frequency becomes equal to a predetermined value (precisely, a constant value set based on the desired engine speed NED). With this, the voltage of outputted or generated AC power does not vary, i.e., can be stable even when the engine speed NE changes abruptly.

In the case where the load 30 is a lighting fixture or the like, the fluctuation in voltage causes flickering light, as shown in FIGS. 14 and 16.

However, the cycloconverter generator according to the embodiment can surely avoid such a problem. Although in the generator according to this embodiment the stability of frequency is lowered as can be clearly seen from the contrast between FIGS. 15 and 16, it should be noted that the fluctuation in frequency usually does not affect the load 30.

As stated above, the embodiment is configured to have a cycloconverter generator (10) equipped with a magneto (14) having an internal combustion engine (12) and three-phase output windings (16) facing a pair of permanent magnets (14b1) to produce three-phase output when one of the windings and permanent magnets is rotated by the engine, single-phase output windings (20) facing the permanent magnets to produce phase signals each indicative of a phase of the three-phase output per one rotation; a bridge circuit (24) comprising positive and negative switching elements (positive group converter 24a, negative group converter 24b) bridge-connected in antiparallel connection to the three-phase output windings to constitute a cycloconverter, and an AC power generator (effective voltage controller 26b) that generates single-phase AC power to be supplied to a load (30) by turning on the switching elements in accordance with a desired frequency, comprising: an actuator (12b) adapted to change a speed of the engine; a required power detector (effective voltage controller 26b, S10) that detects AC power required by the load; a desired engine speed determiner (effective voltage controller 26b, S12) that determines a desired speed NED of the engine based on the required AC power; and an actuator controller (effective voltage controller 26b, throttle controller 26d, S14) that controls operation of the actuator such that the engine speed becomes equal to the desired engine speed; wherein the AC power generator generates the required AC power by turning on the switching elements such that a number of the phase signal to be produced within one period of frequency of the AC power to be generated, becomes equal to a number determined by the desired engine speed (S16, S18).

With this, since the desired engine speed NED of the engine 12 is determined based on the detected required power and the actuator 12b is driven to achieve the determined engine speed NED, it becomes possible to prevent undesirable increase in fuel consumption and noise when the required power by the load 30 is small.

Further, it is configured such that the switching elements are turned on to generate AC power so that a number of the phase signal to be produced within one period of frequency of the AC power to be generated becomes equal to a number corrected in response to the determined desired engine speed NED, in other words, such that a frequency of the AC power is synchronized with the engine speed NE. With this, it becomes possible to generate stable AC power even when the engine speed changes abruptly.

In the cycloconverter generator, the AC power generator generates the required AC power by turning on the switching elements in such a manner that the frequency of the AC power and a zero cross-point of the phase signals are made identical to each other. With this, in addition to the above effects, it becomes possible to reliably synchronize the frequency of AC power to be generated with the engine speed.

It should be noted that, although the thyristors are used as switching elements, an FET or any other devices can instead be utilized.

It should also be noted that, although the phase signal (V-phase pulse) is detected from the output of the output winding 20 facing the rotor installed with the permanent magnets, it can be detected using a hall IC or a pickup coil.

Japanese Patent Application No. 2008-123323 filed on May 9, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A cycloconverter generator equipped with a magneto having an internal combustion engine and three-phase output windings facing a pair of permanent magnets to produce three-phase output when one of the windings and permanent magnets is rotated by the engine, single-phase output windings facing the permanent magnets to produce phase signals each indicative of a phase of the three-phase output per one rotation; a bridge circuit comprising positive and negative switching elements bridge-connected in antiparallel connection to the three-phase output windings to constitute a cycloconverter, and an AC power generator that generates single-phase AC power to be supplied to a load by turning on the switching elements in accordance with a desired frequency, comprising:

an actuator adapted to change a speed of the engine;
a required power detector that detects AC power required by the load;

a desired engine speed determiner that determines a desired speed of the engine based on the required AC power;

an actuator controller that controls operation of the actuator such that the engine speed becomes equal to the desired engine speed;

wherein the actuator controller determines a phase signal number from the desired engine speed; and wherein the AC power generator generates the required AC power by turning on one or more of the switching elements such that the determined phase signal number becomes equal to a phase signal number to be produced within one period of frequency of the AC power to be generated.

2. The generator according to claim 1, wherein the AC power generator generates the required AC power by turning on the switching elements in such a manner that the frequency of the AC power and a zero cross-point of the phase signals are made identical to each other.

3. The generator according to claim 1, further including:
a frequency setting switch adapted to allow an operator to set the desired frequency.

4. A method of controlling a cycloconverter generator equipped with a magneto having an internal combustion engine and three-phase output windings facing a pair of permanent magnets to produce three-phase output when one of the windings and permanent magnets is rotated by the engine, single-phase output windings facing the permanent magnets to produce phase signals each indicative of a phase of the three-phase output per one rotation; a bridge circuit comprising positive and negative switching elements bridge-connected in antiparallel connection to the three-phase output windings to constitute a cycloconverter, and an actuator adapted to change a speed of the engine, comprising the steps of:

detecting AC power required by the load;

determining a desired engine speed based on the required AC power;

determining a phase signal number based on the desired engine speed;

controlling operation of the actuator such that the engine speed becomes equal to the desired engine speed; and generating single-phase AC power to be supplied to a load by turning on one or more of the switching elements in accordance with the determined phase signal number, and the step of AC power generating the required AC power by turning on the switching elements such that the determined phase signal number becomes equal to a phase signal number to be produced within one period of frequency of the AC power to be generated.

5. The method according to claim 4, wherein the step of AC power generating generates the required AC power by turning on the switching elements in such a manner that the frequency of the AC power and a zero cross-point of the phase signals are made identical to each other.

6. The method according to claim 1, further including the step of:
allowing an operator to set the desired frequency.

* * * * *